United States Patent [19]

Bosio et al.

[11] Patent Number: 5,454,589
[45] Date of Patent: Oct. 3, 1995

[54] INFLATABLE AIR CELL PROTECTIVE DEVICE

[75] Inventors: Allen C. Bosio, Korntal, Germany; Kirk Storey, Farmington; Brent K. Olson, Clearfield, both of Utah

[73] Assignee: Morton International, Inc., Chicago, Ill.

[21] Appl. No.: 292,368

[22] Filed: Aug. 18, 1994

[51] Int. Cl.[6] ................................................. B60R 21/24
[52] U.S. Cl. ........................................ 280/729; 280/743.1
[58] Field of Search ................... 280/729, 743.1, 280/730.2

[56] References Cited

U.S. PATENT DOCUMENTS

| | | | |
|---|---|---|---|
| 4,227,717 | 10/1980 | Bouvier | 280/753 |
| 5,114,180 | 5/1992 | Kami et al. | 280/743.1 |
| 5,131,434 | 7/1992 | Krummheuer et al. | 139/35 |
| 5,205,583 | 4/1993 | Henseler et al. | 280/743.1 |

*Primary Examiner*—Kenneth R. Rice
*Attorney, Agent, or Firm*—George W. Rauchfuss, Jr.; Gerald K. White

[57] ABSTRACT

A device for protecting a vehicle occupant in the event of a collision includes an array of semi-rigid inflatable cells which support a portion of the vehicle's interior lining. Upon occurence of a crash of sufficient magnitude, the cells are inflated by a gas to advance the lining in the occupant's direction.

7 Claims, 1 Drawing Sheet

INFLATABLE AIR CELL PROTECTIVE DEVICE

TECHNICAL FIELD

This invention relates to the field of motor vehicle occupant restraint systems. More particularly, it relates to such a system in the form of a gas expandable device comprising a plurality of semi-rigid air cells.

BACKGROUND ART

The use of gas expandable airbags for protecting vehicle occupants is well established. These devices, which inflate upon actuation by a crash sensor, have proven very effective in protecting the driver and front seat passenger. Such a device is in the form of a balloon-like bag positioned to receive the impact of the head and upper torso. The head and upper torso present a relatively large impact area and its impact energy is well-absorbed by such a device.

It would be desirable, however, to provide an inflatable restraint device which would be capable of absorbing a more concentrated force. One example of such a requirement would be a knee bolster. The knee, being a relatively small area object, imparts its kinetic energy into a concentrated area. A single airbag would need to be very large and stiff to properly manage such an impact.

A second application which would be difficult to implement using conventional airbags involves side impacts. Passengers involved in such impacts require protection from relatively large surface areas of the vehicle such as side pillars and doors.

It would also be desirable to provide a device which would inherently have built-in crash protection to a certain degree, even in the absence of inflation. In such a device, the degree of inflation could be varied to alter the degree of protection afforded.

Accordingly, it is a primary object of the present invention to provide an inflatable crash protection device which is capable of handling concentrated impact loads. Another object of this invention is to provide such an apparatus which can cover a relatively large area. Another object is to provide such a device which has an energy-absorbing structure, even in the absence of inflation. Other objects, features, and advantages will become apparent from the following description and appended claims.

DISCLOSURE OF INVENTION

The invention comprises an energy absorption device in the form of an array of gas expandable semi-rigid hollow cells. The cells are in substantially side-by-side relationship and each has an open first end and a closed second end. An inflator is provided which is responsive to a crash sensor to produce pressurizing gas upon occurrence of a crash. The gas is channeled into the first ends of the hollow cells which are thereby caused to expand. A contact surface engages the closed second ends of the hollow cells and is movable with them to restrain movement of, and thereby protect, a vehicle occupant.

Figure 1:
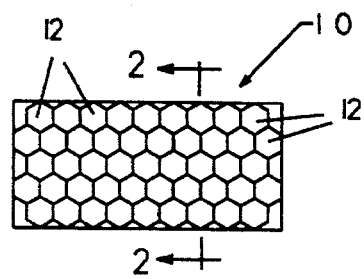
FIG. 1 is a plan view of a device in accordance with this invention with the top panel removed.
Figure 4:
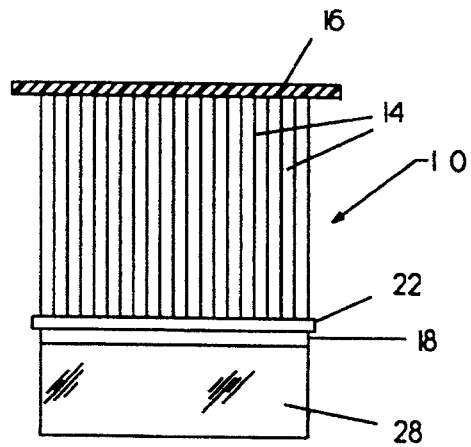
Figure 5:
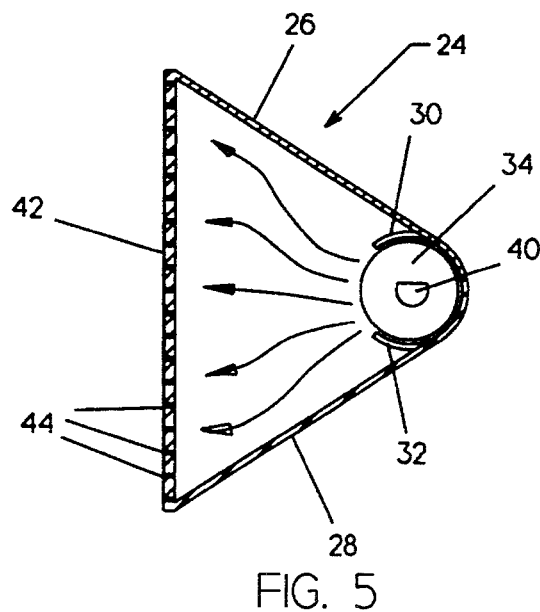

FIG, 3 is a right end view of the device of FIG, 1 in an expanded condition;

FIG. 4 is an elevational view of the device of FIG. 1 in an expanded condition; and FIG. 5 is an enlarged cross section illustrating the manner in which the device of the invention is inflated.

BEST MODE FOR CARRYING OUT THE INVENTION

Figure 2:
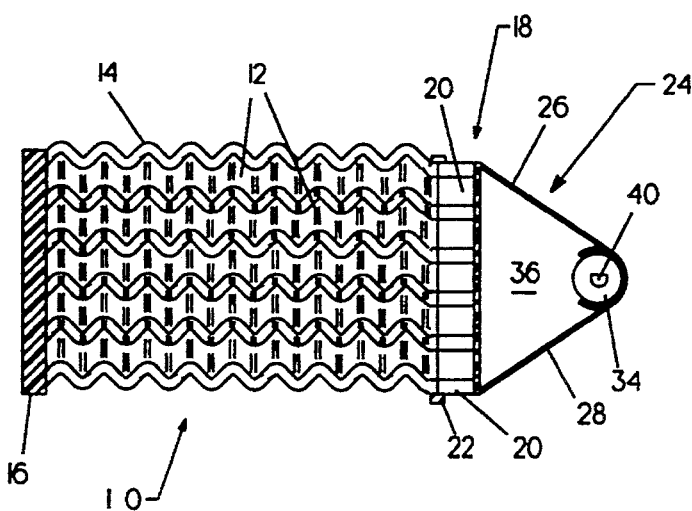
FIG. 2 is an enlarged cross-section taken substantially along the line 2—2 of FIG, 1.

At the heart of this invention lies an array 10 of individual pressurizable cells 12. The cells which are illustrated in FIG. 1 are hexagonal in cross-section. However, they could be of substantially any configuration, including round or other polygonal shape They are characterized by the fact that the walls 14 which form the cells are semi-rigid. They might best be visualized as formed from plastic or thin aluminum, resembling the wall of a soft drink can. As initially installed, the walls are crumpled, or corrugated, as illustrated in FIG. 2. At one end the cells of the array are closed and support a liner 16 forming a portion of the passenger enclosure of a motor vehicle, such as the inner surface of a door or pillar. The other end of the cell array 10 is connected to a manifold 18 which includes individual passages 20 which connect, respectively, with the open ends of the cells 12 to which they are sealed by a suitable sealing band 22.

The manifold 18 supplying the cell array is mounted on a reaction canister 24. The reaction canister 24 has a form similar to those found in passenger-side airbag installations. It is in the form of a trough having sidewalls 26, 28 which enclose by suitable constraining members 30, 32 a cylindrical inflator 34. The ends of the reaction canister 24 are closed by end plates 36, 38.

The inflator 34 is conventional. Its sidewall includes the usual gas discharge ports (not shown) which face into the reaction canister 24 and are maintained in correct position by a key 40 engaging a suitable keyway in the endplate 38. The opening of the trough shaped reaction canister 24 is closed by a diffuser 42. The diffuser 42 defines a plurality of passageways 44 which communicate between the interior of the reaction canister 24 and the passages 20 leading to the array of cells 12.

As initially installed within a motor vehicle, the walls 14 of the cells 12 are crumpled or corrugated as described above. In this condition, they retain structural integrity even though they remain unpressurized except for atmospheric pressure trapped within the module. As a result, they are capable of absorbing impacts and protecting against injuries in relatively minor collisions.

Figure 3:
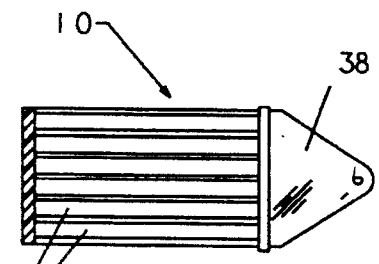

Under more severe conditions, the cylindrical inflator (which may be of the type commonly used in airbag modules) is activated by a crash sensor in a manner well known to the art. This ignites the gas generating charge to produce combustion gas or releases pressurized gas within the inflator 34. These gases travel, as illustrated by the arrows in FIG. 5, to the diffuser 42 and pass through the passages 44 into the array of individual gas cells 12. These cells are thereupon caused to expand as illustrated in FIGS. 3 and 4 such that the walls 14 of the individual cells 12 are straightened. As a result, the liner 16 is moved inwardly toward the vehicle passengers to better absorb impact energies and protect the occupants. The amount of straightening may be controlled by adjusting the flow of inflating gas.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. An energy absorption device for use in a motor vehicle crash protection system including a crash sensor which comprises:

an array of gas-expandable semi-rigid hollow cells in substantially side-by-side relationship, each of said cells having an open first end and a closed second end;

inflation means responsive to said sensor for producing pressurizing gas upon occurrence of a crash of preselected magnitude;

means for channeling said pressurizing gas into the first ends of said hollow cells to expand them, moving the second ends away from the first ends; and a vehicle occupant-contacting surface engaging the closed second ends of said hollow cells and movable with said closed ends upon expansion of said cells under the influence of said pressurizing gas to restrain movement of a vehicle occupant.

2. The device of claim 1 wherein said cells are formed of metal.

3. The device of claim 2 wherein said metal is aluminum.

4. The device of claim 1 wherein each of said cells is of polygonal cross section.

5. The device of claim 4 wherein said polygon is a hexagon.

6. The device of claim 1 wherein said inflation means comprises an airbag inflator.

7. The method of protecting a vehicle occupant from injury due to impact with a portion of the vehicle resulting from a vehicular collision which comprises:

providing upon said vehicle portion an array of gas-expandable semi-rigid hollow cells in substantially side-by-side relationship, each of said cells having an open first end and a closed second end, the second ends supporting an occupant-contacting surface;

producing a pressurizing gas upon occurrence of a crash of preselected magnitude;

channeling said pressurizing gas into the first ends of said hollow cells to expand them, moving the second ends away from the first ends; and expanding said cells under the influence of said pressurizing gas to advance said occupant-contacting surface to restrain movement of a vehicle occupant.

* * * * *